W. A. FLANDERS.
Bee Hive.
No. 64,515.
2 Sheets—Sheet 1.
Patented May 7, 1867.
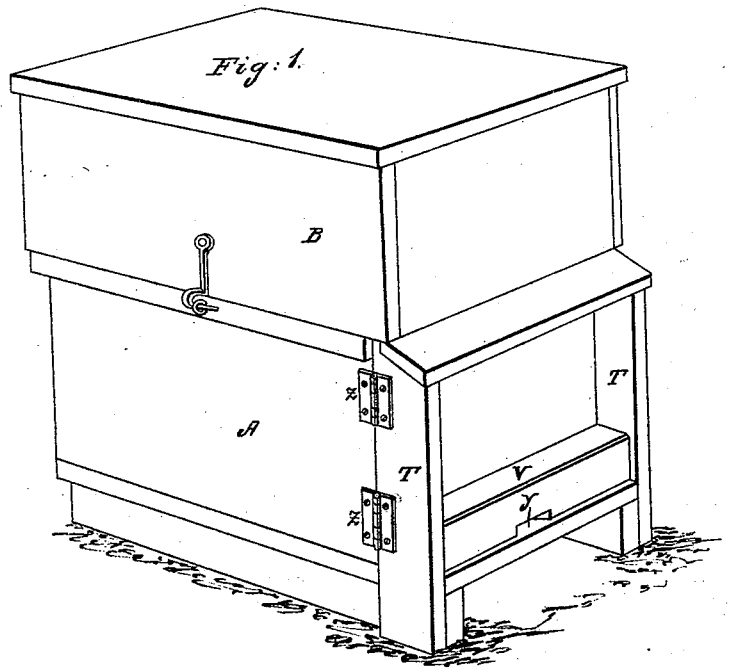
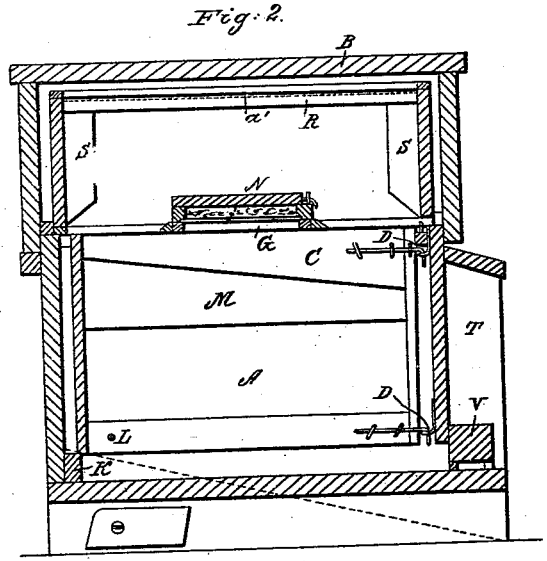
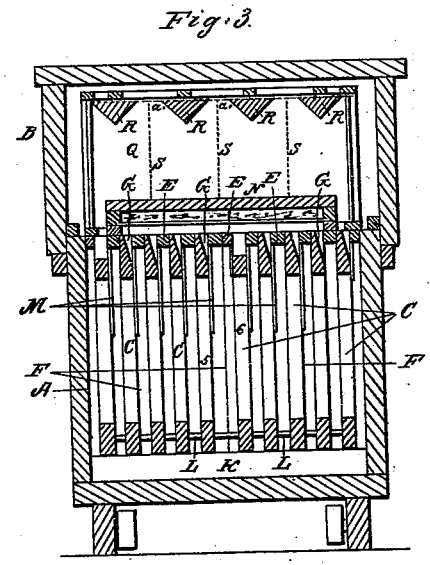
Witnesses:
W. H. Burridge
J. Holmes.
Inventor:
W. A. Flanders.

W. A. FLANDERS.
Bee Hive.
No. 64,515.
2 Sheets—Sheet 2.
Patented May 7, 1867.
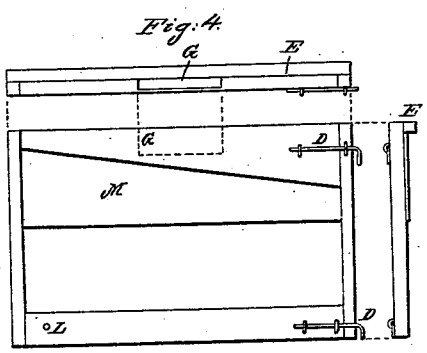
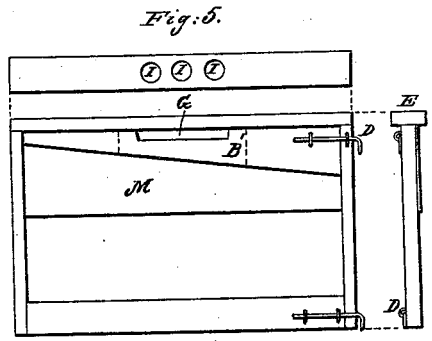
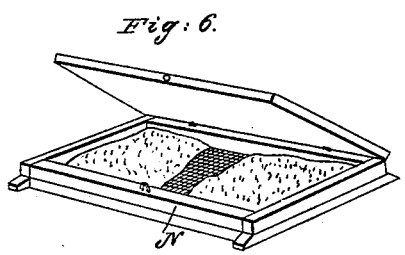
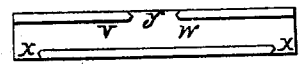
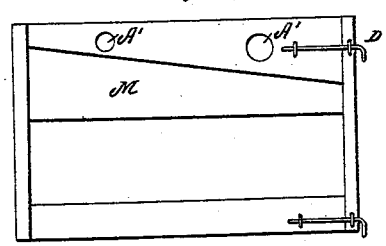
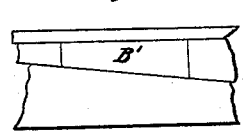
Witnesses:
W. H. Burridge
J. Holmes.
Inventor:
W. A. Flanders.

United States Patent Office.

W. A. FLANDERS, OF SHELBY, OHIO.

Letters Patent No. 64,515, dated May 7, 1867.

IMPROVEMENT IN BEE-HIVES.

The Schedule referred to in these Letters Patent and making part of the same.

TO ALL WHOM IT MAY CONCERN:

Be it known that I, W. A. FLANDERS, of Shelby, in the county of Richland, and State of Ohio, have invented certain new and useful improvements in Bee-Hives; and I do hereby declare that the following is a full and complete description of the same, reference being had to the accompanying drawings, making a part of this specification, in which—

Figure 1 is a perspective view.
Figure 2 is a longitudinal vertical section.
Figure 3 is a transverse section.
Figures 4, 5, 6, 7, 8, and 9, are detached sections, which will be referred to in the description.
Like letters of reference refer to like parts in the different views.
The nature of my improvement relates—

First, to the construction and arrangement of the movable comb-frames of bee-hives in such a manner as to allow the bees to pass from the body or main portion of the hive below into the honey receptacle above, through the top bars of the comb-frames directly into the honey-box, at a proper time and way, without the attention or assistance of the bee-keeper, which also lessens the distance usually required between the hive below and box above.

Second, to the employment of sanded surfaces in the bee-hive and box, where the bees attach or glue the comb and frames together to the sides of the hive and other places where sticking and glueing are not desired.

Third, the arrangement and use of sanded paper comb-guides between the comb-frames, and for the lining of the communicating bee passages through the combs and frames.

Fourth, to an improved mode of ventilating the hive, whereby the bees are protected from the extremes of heat and cold. The sun is excluded from the bee entrance and the interior of the hive, allowing the bees to repose in quiet in the hive while in winter quarters.

Fifth, to the construction and arrangement of the bee entrance of the hive, in such a manner as to greatly assist the bees in protecting the interior of said hive against robber bees, and exclude gusts of wind, snow, rain, dust, &c.

This hive is constructed in two section, A and B, plate 1, of which A is the body of the hive, and B the chamber, in which is placed the honey-box. In section A is arranged a system of movable comb-frames, C, fig. 3. These frames are hinged to the front side of the hive by the hooks and eyes D, by means of which they may be spread out like the leaves of a book. The position and construction of the hook are such as to allow the removal of the frames by lifting them from the eye, for any purpose required, by the operator, such as making artificial swarms, inspecting the combs, &c. There may be more or less of these frames according to the size of the hive. They consist of a light framework, shown in fig. 4, plate 1.1, in which it will be seen that the frame is provided with a rib, E, running along on one side of the top, and by which the frames are kept apart, thus making spaces between them below this rib, as shown in fig. 3, plate 1, F being the spaces. It will be seen that the frame No. 5 is provided with a space between it and the frame 6, wider than are the others; this space is immediately over the bee-door, thereby giving more room to the bees on entering the hive. By these ribs the tops of the frames are made to fit close together, and thus exclude the bees from the honey-boxes, except when they enter through the passages provided for them, which may be seen at the top of the frames, as shown at G, figs. 4 and 5, plate 1.1, which on the side of the frames is an elongated aperture or passage-way, which may communicate with several holes corresponding to I in the top, and through which the bees pass up into the honey-boxes, or a slot may be continued through the top, as shown at G, figs. 3 and 4. The advantage of having the slot or passage-way through the top bar of the frame, instead of mortising or cutting away the fillet or rib E to form an opening or passage for the bees, admits a strip or piece of paper B', fig. 8, being attached to the side of the top bar of the frame, so as to close up the said passage-way to the boxes above. When the frames are made close-fitting to each other, and the bees compelled to pass through the top bars of the comb-frames, they may be kept out of the honey-boxes above until the lower part of the hive is partially filled. This is necessary and useful, for if they are allowed to go up into the honey-boxes when first hived after swarming, the queen will pass up and remain there, depositing eggs and rearing brood, which greatly injures the spare honey. By my arrangement, paper of any required thickness may be pasted over the holes through the top of the comb-frames, on the side of the top bars, as before stated, in the hive below the boxes, and thus the communications to the boxes above are cut off until the bees have partially or fully completed comb-building below, when they will eat through this paper and go into the honey-boxes above, and fill them with comb and honey, without any attention on the part of the bee-master. I do not confine myself to the peculiar method above described, but claim any method by which the bees may be allowed to pass up through or prevented from passing through the top bars in the manner above described. The under side of the upper rail of the frame is not parallel to the bottom rail, but is tapering in the direction toward the front of the hive, as shown in figs. 4 and 5, the purpose of which is to brace and thus add to the strength of the frame. The rear ends of the frame rest upon the cross-piece K when in place, and are thus prevented from sagging; they are also prevented from a lateral displacement by the pins L. M is a piece of sanded paper, which consists of two pieces of ordinary sand-paper pasted together with the sanded sides outward, and are for the purpose of comb-guides. Sanded paper is also used for lining the passage-ways which communicate from comb to comb, thus preventing the bees from building cross-combs and from closing the passages. The apertures in the top of the frames, except the outside ones, are covered in the winter season with the preserver N, fig. 6, plate 1.1, as seen in fig. 3. This preserver consists of a shallow box, the bottom of which is a wire netting. In this box is placed an absorbent, which may consist of small pieces of broken brick or any other material of a suitable nature, for the purpose of taking up the exhalations of the bees. It may also be used in the spring for feeding the swarm, and for this purpose it is well adapted. The upper section of this hive consists of the box B above referred to, which can be easily removed in order to obtain access to the honey-boxes, or for other needful purposes. The sides of the honey-box Q, fig. 3, plate 1, are made of glass, the ends of wood, and the top of sand-paper, with the sanded side inward, and is sectioned off by the guide-strips R, which run lengthwise across the top of the box, and the projecting pieces or guides S, which are made of thick sand-paper. The guides referred to are not sanded, neither are the ends of the box enclosed between them; hence the bees will build the comb along the guides, to which they can secure it, also to the ends of the box, avoiding the paper for the reason that they cannot glue the comb to it. Thus the comb is confined to the guides in straight sheets, which can be easily removed without danger of breaking the comb or glass. Any number of boxes may be used in the hive, as occasion may require. The bee-door is covered by a vestibule, T, figs. 1 and 2, plate 1, for the protection of the bees when upon the alighting-board. V, fig. 7, is a guard for the bee-door, and when in place is shown in fig. 1. Along the under side of this guard is cut a groove, W, of sufficient size to admit the passage of one bee. At each end of this guard is cut a door, X. These two doors are about equal in capacity to the middle door. By this arrangement of the doors, the bees, in order to enter the hive, must first traverse one-half the length of the guard. Thus, should the bees enter the middle door from without, they must enter the hive through the end doors X, or should the end doors be outside, the bees enter them and into the hive through the middle door Y. By means of this device, when used for ventilating the hive, while the bees are allowed to pass and repass without hindrance, the sunlight, wind gusts, dust, snow, and rain, are excluded from the interior of the hive. This device requires no change or attention on the part of the bee-master. The air passing through the entrance to the right and left of the hive on the outside of the comb, and when the weather changes from warm to cold in the winter, the air entering on the outside of the combs, allows the bees to contract toward a common centre, where no blast of wind, dust, or rain, or ray of sunlight can reach to disturb them. This method of ventilation is of great use in wintering bees, as by allowing the air to pass into the hive on each side from the common entrance, and up through the top of the outside spaces, while the centre spaces at the top of the frames are occupied by the preserver above referred to, the bees are kept in a semi-torpid state, and consume much less stores than while they are continually called out in cold weather by the rays of the sun, to say nothing of the loss of bees by such influences. It will be seen that where the bees are allowed to go into one common entrance and pass to the right and left through the dark passages, the bees will remain in said passages in warm weather, and thereby protect the hive from the moth-miller, while the construction is such as to prevent robber bees from entering directly into the hive, while the inmates are allowed to pass and repass without hindrance. This block can be inverted so as to stand upon the screws and thereby allow a full and complete passage for the swarm to work in summer. As above said, access is had to the honey-box by removing the top B. Should it be required to examine the comb-frames at the same time, it is done by opening the sides of section A, which are hung at the front of the hive by the hinges Z. The back of the hive-case is divided vertically through the middle and each division connected to the sides. The three sides of the hive can thus be opened at the same time, and thus the frames are brought out of the hive and completely exposed to view without in any way displacing the combs, and with little disturbance to the bees. It will be seen that the top of the frames and sides which are in contact with each other are sanded, so also are the communicating bee-passages A', fig. 9, and the inside of the lower section. The purpose of thus sanding the several parts above specified, is in order to prevent the bees from attaching the comb to them, so that on opening the hive and removing the frames it may be done without breaking the comb and thereby injuring the condition of the hive, for it is found to be impossible for he bees to glue the comb to surfaces thus sanded, or to glue surfaces thus sanded together.

I claim as my improvement in M. De Beauvoy's movable comb-frames of 1851, (whose tops are closely fitting together, while their sides and bottoms are suitably separated as well from each other as from the hive or case containing them,) and desire to secure by Letters Patent—

1. The ways or passages G, for the bees, commencing at one side of the comb-guides and passing through the top bars of the comb-frames, substantially as and for the purpose set forth.

2. I claim the use of sanded surfaces for the comb-frames, as and for the purposes set forth.

3. I claim the use of glassed or sanded paper for comb-guides M, and linings to the communicating bee-passages A' from comb to comb, substantially as and for the purposes set forth.

4. I claim ventilating the hive through the top bars of the outside comb-frames, and preserver H, constructed as described, from the diverging ways W, and doors X and Y of the common entrance, as and for the purposes specified.

5. I claim the bee-entrance guard V, having diverging passage-ways W from the central or common ingress Y, the same being either reversible or stationary, as and for the purposes set forth.

W. A. FLANDERS.

Witnesses:
 W. H. BURRIDGE,
 E. E. WAITE.